Figure 1:
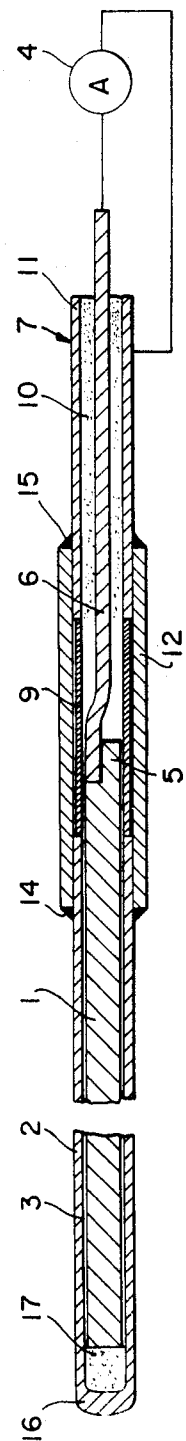

United States Patent

[11] 3,591,811

| [72] | Inventor | Ross Bisbee Shields |
| | | Deep River, Ontario, Canada |
| [21] | Appl. No. | 779,761 |
| [22] | Filed | Nov. 29, 1968 |
| [45] | Patented | July 6, 1971 |
| [73] | Assignee | Atomic Energy of Canada Limited |
| | | Ottawa, Ontario, Canada |

[54] GAMMA FLUX DETECTOR AND METHOD OF MANUFACTURE THEREOF
7 Claims, 2 Drawing Figs.

| [52] | U.S. Cl. | 250/83.3, 250/83.1 |
| [51] | Int. Cl. | G01t 1/16 |
| [50] | Field of Search | 250/83.1, 83.3, 83.6; 313/93 |

[56] References Cited

UNITED STATES PATENTS

| 3,375,370 | 3/1968 | Hilborn | 250/83.1 |
| 3,385,988 | 5/1968 | Hyun | 250/83.6 X |

*Primary Examiner*—James W. Lawrence
*Assistant Examiner*—Davis L. Willis
*Attorney*—James R. Hughes ABSTRACT: A gamma flux detector comprising an emitter of zirconium or a zirconium alloy which is insulated from say a nickel chromium alloy collector by means of an oxidized coherent layer of the emitter material. The detector is manufactured by placing the emitter with the oxidized surface layer thereon in an oversize tube of the collector material and reducing the oversize tube to form the collector.

PATENTED JUL 6 1971   3,591,811

INVENTOR
ROSS B. SHIELDS
By J. R. Hughes
AGENT

GAMMA FLUX DETECTOR AND METHOD OF MANUFACTURE THEREOF

This invention relates to a gamma flux detector and the manufacture thereof, which is particularly useful for gamma flux measurements in nuclear reactors. A gamma detector in accordance with the invention is also useful for mapping flux intensities in nuclear reactor cores.

It has already been proposed in U.S. Pat Specification No. 3,375,370 to provide a "self-powered" neutron detector comprising, for example, a central vanadium emitter, coaxially disposed within a stainless steel collector, and electrically insulated therefrom by magnesium oxide insulation. The emitter and collector are connected by the inner and outer conductors, respectively, of a coaxial cable to a current measuring device. When the neutron detector is disposed within a neutron flux the emitter produces energetic electrons following the absorption of neutrons, whilst the collector produces few electrons. Consequently a current is produced between the emitter and the collector and the intensity of this current indicated on the current measuring device is a measure of the intensity of the neutron flux within which the neutron detector is disposed.

Detectors which are sensitive mainly to gamma rays and which have low sensitivity to neutrons have also been constructed with a configuration similar to the above by substituting for the neutron sensitive emitter material one that has a very low neutron capture cross section but which has an atomic number substantially different, either higher or lower than that of the collector sheath material. In a gamma radiation field, energetic electrons are produced in the electrodes as a result of photoelectric and Compton interactions, the greater number being produced in the electrode of higher atomic number. Consequently the intensity of the current indicated on a current measuring device depends on the difference in atomic number of the two electrodes. A practical form of such a gamma detector designed for severe environmental conditions such as in the core of a nuclear reactor consists of a zirconium alloy emitter coaxially disposed within a nickel chromium iron alloy collector and electrically insulated there from by magnesium oxide insulation.

In the conventional method of manufacturing this detector the insulation, initially in the form of crushable magnesium oxide beads, is strung onto the emitter wire after which it is inserted in a tube and the coaxial assembly is swaged or drawn into a continuous cable during which the beads are crushed and become compressed powder. It has been found that the sensitivity of the gamma detector increases as the thickness of the insulation is reduced. Unfortunately, however, it has not been practical to make the insulation as thin as desired by the above method.

It is one object of the present invention to provide a gamma detector having enhanced sensitivity to gamma rays to that of known gamma detectors of the type described above by employing a very thin oxidized coherent layer of insulation on the zirconium alloy emitter instead of compressed powder.

The use of a thin coherent layer of insulation has several other advantages besides enhanced sensitivity. One advantage arises from the fact that it is possible to produce very uniform coherent layers of zirconium oxide so the resulting detector has very uniform sensitivity along its length.

A further advantage is that the zirconium oxide layer is very hard and durable and is very little affected electrically or mechanically by atmospheric moisture in contrast to magnesium oxide beads which are fragile and absorb moisture so readily that they must be stored and handled in a controlled environment.

According to the invention there is provided a gamma flux detector, comprising an electrically conductive emitter which produces an electrical current when disposed in a gamma flux, an electrically conductive collector which produces an electrical current smaller in magnitude than that of the said emitter when both are disposed in the same gamma flux, an electrical insulating material electrically insulating the said emitter from the said collector, and means for measuring the magnitude of an electrical current difference between said collector and said emitter as an indication of the intensity of the gamma flux within which the detector is disposed, the improvement comprising the said emitter is of a material selected from the group zirconium and zirconium base alloys, and the said electrical insulating material is an oxidized, coherent surface layer of emitter material.

Further according to the invention, there is provided a gamma flux detector according to the above, wherein said collector is of a material selected from the group titanium, stainless steel, and nickel base alloys, chromium alloys and said material contains less than 0.1 percent by weight of cobalt and less than 0.2 percent by weight of manganese.

In this specification reduced in size means swagging, drawing and other ways of shaping the oversize tube to a tube of smaller bore.

Preferably the emitter is a wire, and the collector is a tube coaxially disposed about the emitter.

Conveniently the emitter is between 0.010 and 0.030 inches in diameter, the oxidized, coherent surface layer is between 0.0002 and 0.005 inches in thickness and said collector has a wall thickness of between 0.005 and 0.015 inches.

In a preferred embodiment of the invention the emitter is of a zirconium base alloy containing by weight 1.2 percent to 1.7 percent tin, 0.07 percent to 0.2 percent iron, 0.05 percent to 0.15 percent chromium, 0.03 percent to 0.08 percent nickel, balance zirconium except for impurities which may be present.

Further according to the invention there is provided a method of manufacturing a gamma flux detector, wherein a wire of a material selected from the group zirconium and zirconium base alloys is oxidized to form an oxidized coherent surface layer on the wire, the wire with said oxidized coherent surface layer thereon is disposed in the bore of an oversize tube of a material which will produce an electrical current which is smaller in magnitude than that of the said wire when both are disposed in the same gamma flux, the said oversize tube is reduced in size on to the said oxidized, coherent surface layer to form from the tube a collector, and from the wire an emitter separated from the collector by an electrically insulating material provided by the said oxidized, coherent surface layer, and means are connected between the said emitter and the said collector for detecting an electrical current difference produced between said emitter and the said collector when both are disposed in the same gamma flux.

The oxidized coherent surface layer of emitter material is preferably produced by the process described in the specification of U.S. Pat. Application Ser. No. 653,721.

Figure 2:
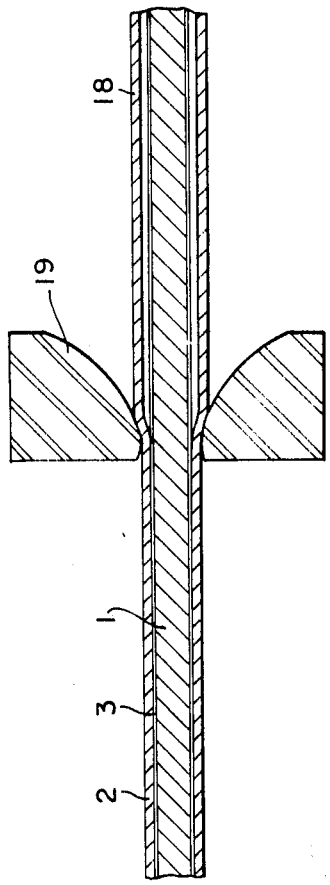

In the accompanying drawings which illustrate, by example, an embodiment of the invention, FIG. 1 is a sectional side view of a gamma flux detector, and FIG. 2 is a sectional side view of an emitter for the gamma flux detector shown in FIG. 1, showing a collector being reduced in size around the emitter.

In FIG. 1 there is shown an electrically conductive emitter 1 which produces an electrical current when disposed in a gamma flux, an electrically conductive collector 2 which produces an electrical current smaller in magnitude than that of the emitter 1 when both are disposed in the same gamma flux, an electrical insulating material 3 electrically insulating the emitter 1 from the collector 2, and means 4 for measuring the magnitude of an electrical current difference between the the collector 2 and the emitter 1 as an indication of the intensity of the gamma flux within which the detector is disposed. The emitter 1 is of a material selected from the group zirconium and zirconium base alloys, in this instance it is a zirconium base alloy containing by weight 1.2 percent to 1.7 percent tin, 0.07 percent to 0.2 percent iron, 0.05 percent to 0.15 percent chromium, 0.03 percent to 0.08 percent nickel, balance zirconium except for any impurities which may be present.

This gamma flux detector was intended for use in the core of a nuclear reactor where mixed radiation is present and so the metal from which the collector 2 was made was chosen from those commercially available which contain the least number of elements and quantities thereof which activate appreciably in a neutron flux. For this reason a collector 2 was made from a nickel base alloy containing chromium and iron, and wherein the cobalt content was limited to 0.1 percent maximum by weight, and similarly the manganese content was limited to 0.2 percent maximum by weight.

The particular nickel base alloy used contained by weight 77 percent nickel, 15 percent chromium, 7 percent iron, 0.25 percent silicon, 0.2 percent copper, and 0.08 percent carbon.

For this type of gamma flux detector activation products which are beta emitters are the most undesirable, thus to limit the manganese content therein to less than 0.05 percent by weight is desirable, but as such a nickel base alloy was only commercially available as a special melt this was not done.

Other suitable materials for the collector 2 of a gamma flux detector for use in mixed radiation are stainless steel and titanium, preferably with the cobalt content therein less than 0.1 percent by weight and the manganese content therein less than 0.2 percent by weight.

However, where mixed radiation is present it has been found that it is preferable not to use a collector 2 of aluminum because of the relatively high beta emissions therefrom, when in a neutron flux, in comparison with the above mentioned materials for the collector 2.

It should be noted however, that if the gamma flux detector were for use in gamma flux containing very little or no neutron flux a much wider choice of materials is available from which the collector 2 may be made, and aluminum may then be preferred in some instances because of its relatively low atomic number.

The emitter 1 has an end portion 5 having no electrical insulation 3 thereon which is connected to an inner conductor 6 of a coaxial cable 7 by a metallurgical bond 8, which is capable of passing an electrical current across the connection. The metallurgical bond 8 may be an electrical or ultrasonic weld, a braze or any other suitable bond. A split insulator 9 covers the bond 8 and the bare ends of the conductors 5 and 6. The split insulator 9 used in this instance is a piece of a split tubing of polycrystalline alumina and it extends over an end portion of the electrical insulation 3. The split insulator also contains compressed mineral oxide powder electrical insulation 10 which is used to separate the inner conductor 6 of the coaxial cable 7 from an outer conductor 11 thereof. The outer conductor 11 is cut back so that the inner conductor 6 may bared by removing electrical insulation 10 therefrom, the bond 8 may then be made and the split insulation 9 placed over the bond 8 in the position shown. A metal sleeve 12, is positioned over an end portion of the outer conductor 11 and an end portion of the collector 2. The metal sleeve 12 is welded at 14 and 15 to the collector 2 and outer conductor 11 respectively as an electrical connection there between.

The means 4 comprises an electrical current meter electrically connected to the inner conductor 6 and the outer conductor 11. In this embodiment the length of the collector 2 is 10 feet.

As previously stated when this gamma flux detector is placed in a gamma flux the electrical current indicated on the means 4 gives an indication of the gamma flux intensity. The electrical insulation 3 is an oxidized surface layer of the emitter 1 which is an oxidized surface layer of the emitter material produced by the process described in the specification of U.S. Pat. application Ser. No. 653,721, filed on July 17, 1967 and is 0.001 inches in thickness. As it is possible to use such a tin layer of electrical insulation 3 the sensitivity of the gamma flux detector is $6.2 \times 10^{-16}$ A/rad/h (water does), which is approximately three times more sensitive than other, known types of gamma flux detectors. At the same time the electrical resistance of the electrical insulation 3 is greater than $10^{12}$ ohms at room temperature in spite of the thinness of the electrical insulation 3. However, at 500° C. the electrical resistance of the electrical insulation 3 is about 1 Megohm, which is considerably lower than that for the magnesium oxide electrical insulation already in use in gamma flux detectors. A resistance of 1 Megohm for the electrical insulation 3 is marginal for a high temperature gamma flux detector and so the gamma flux detectors of the invention are most useful at operating temperatures below 500° C., where the electrical insulation 3 has a good electrical resistance for the purpose for which it is provided.

For gamma flux detectors intended to be used at temperatures above 500° C. the electrical resistance of the electrical insulation 3 may be enhanced if the electrical insulation 3 is produced from an emitter 1 of commercially pure zirconium.

Preferably the emitter 1 is between 0.010 and 0.030 inches in diameter, the oxidized coherent surface layer forming the electrical insulation 3, is between 0.0002 and 0.005 inches in thickness, and the collector 2 has a wall thickness of between 0.005 and 0.015 inches.

The end 16 of the collector 2 is initially in the form of an open ended tube and the end of the emitter 1 therein with the electrical insulation 3 on it is cut back to provide a recess. The recess is filled with zirconium oxide 17 in powder form and the end 16 of the collector 2 is heated and fused over the end of the zirconium oxide 17.

In FIG. 2 the same parts of the gamma flux detector as those shown in FIG. 1 are designated by the same reference numerals and the description with reference to FIG. 1 is relied upon to describe them.

In FIG. 2 the emitter 1 in the form of a wire, oxidized to form as the electrical insulation 3 an oxidized coherent surface layer on the wire or emitter 1, is disposed in the bore of an oversize tube 18 which is to form the collector designated 2 in FIG. 1.

After pointing the end of the assembly by crimping the oversize tube 18 is drawn pointed end first through a drawing die 19 of such size that the bore of the oversize tube 18 is reduced to fit tightly over the oxidized layer forming the electrical insulation 3 but not so much as to reduce the diameter of the emitter. The result is a coaxial cable of any practical desired length say 50 to 100 feet, depending on the lengths of the wire or emitter 1 and the oversize tube 18.

This coaxial cable is then cut up into suitable lengths, say 10 feet to form the sensitive sections of several gamma flux detectors. As described above one end is insulated and closed and the other end is spliced to a suitable length of mineral insulated metal sheathed coaxial cable, as shown in FIG. 1.

It will be appreciated that instead of using the drawing die 19 the oversize tube 18 may be reduced by other conventional means such as swagging. In the above embodiment using the drawing die 19 the oversize tube 18 had a clearance of 0.010 inches between its bore and the electrical insulation 3.

In different embodiments of the invention the emitter is either zirconium or a zirconium base alloy comprising by weight 1.2 percent to 1.7 percent tin, 0.18 percent to 0.24 percent iron, 0.07 percent to 0.13 percent chromium, balance zirconium except for any impurities.

What I claim is:

1. A gamma flux detector, comprising an electrically conductive emitter which produces an electrical current when disposed in a gamma flux, an electrically conductive collector which produces an electrical current smaller in magnitude than that of the said emitter when both are disposed in the same gamma flux, an electrical insulating material electrically insulating the said emitter from the said collector, and means for measuring the magnitude of an electrical current difference between said collector and said emitter as an indication of the intensity of the gamma flux within which the detector is disposed, the improvement comprising the said emitter is of a material selected from the group zirconium and zirconium base alloys and the said electrical insulating material is an oxidized, coherent surface layer of emitter material.

2. A detector according to claim 1, wherein said emitter is a wire, and said collector is a tube coaxially disposed about said emitter and said oxidized, coherent surface layer.

3. A flux detector according to claim 2, wherein said emitter is between 0.010 and 0.030 inches in diameter, said oxidized, coherent surface layer is between 0.0002 and 0.005 inches in thickness, and said collector has a wall thickness of between 0.005 and 0.015 inches.

4. A flux detector according to claim 3, wherein the said emitter is of a zirconium base alloy containing by weight 1.2 percent to 1.7 percent tin, 0.07 percent to 0.2 percent iron, 0.05 percent to 0.15 percent chromium, 0.03 percent to 0.08 percent nickel, balance zirconium except for any impurities which may be present.

5. A gamma flux detector according to claim 1, wherein said collector is of a material selected from the group titanium, stainless steel and nickel base alloys, chromium base alloys, and said material contains less than 0.1 percent by weight of cobalt and less than 0.2 percent by weight of manganese.

6. A method of manufacturing a gamma flux detector, wherein a wire of a material selected from the group zirconium and zirconium base alloys is oxidized to form as an electrical insulation an oxidized coherent surface layer on the wire, the wire with said oxidized coherent surface layer thereon is disposed in the bore of an oversize tube of a material which will produce an electrical current which is smaller in magnitude than that of the said wire when both are disposed in the same gamma flux, the said oversize tube is reduced in size on to the said oxidized, coherent surface layer, to form from the tube a collector, and from the wire an emitter separated from the collector by the electrically insulating material provided by the said oxidized, coherent surface layer, and means are connected between the said emitter and the said collector for detecting an electrical current difference produced between said emitter and the said collector when both are disposed in the same gamma flux.

7. A method according to claim 6, wherein said wire is of an alloy containing by weight 1.2 percent to 1.7 percent tin, 0.07 percent to 0.2 percent iron, 0.05 percent to 0.15 percent chromium, 0.03 percent to 0.08 percent nickel, balance zirconium except for any impurities which may be present, said wire has a diameter of between 0.010 and 0.030 inches diameter, the said wire is oxidized to produce said oxidized layer thereon having a thickness of between 0.0002 and 0.005 inches, said oversize tube is reduced in size by between 0.005 and 0.015 inches.